(12) United States Patent
Ferris

(10) Patent No.: US 10,279,690 B2
(45) Date of Patent: May 7, 2019

(54) COMPACT POWER SUBSTATION FOR USE WITH ELECTRIC VEHICLE CHARGING STATIONS

(71) Applicant: POWER SYSTEMS TECHNOLOGY (EEGENCO) LTD, Waterloo (CA)

(72) Inventor: Laurie Ferris, Manotick (CA)

( * ) Notice: Subject to any disclaimer, the term of this patent is extended or adjusted under 35 U.S.C. 154(b) by 0 days.

(21) Appl. No.: 15/801,594

(22) Filed: Nov. 2, 2017

(65) Prior Publication Data

US 2018/0056796 A1  Mar. 1, 2018

Related U.S. Application Data

(63) Continuation-in-part of application No. PCT/CA2016/051071, filed on Sep. 9, 2016.

(Continued)

(51) Int. Cl.
| | |
|---|---|
| *H02J 7/00* | (2006.01) |
| *B60L 11/18* | (2006.01) |
| *H02B 7/00* | (2006.01) |
| *H02B 7/06* | (2006.01) |
| *H02J 7/02* | (2016.01) |

(52) U.S. Cl.
CPC ........ *B60L 11/1816* (2013.01); *B60L 11/1851* (2013.01); *B60L 11/1861* (2013.01); *H02B 7/00* (2013.01); *H02B 7/06* (2013.01); *H02J 7/0027* (2013.01); *H02J 7/02* (2013.01); *Y02T 10/7055* (2013.01)

(58) Field of Classification Search
CPC ..................................................... Y02T 90/14
USPC ......................................................... 320/109
See application file for complete search history.

(56) References Cited

U.S. PATENT DOCUMENTS 5,548,200 A * 8/1996 Nor ..................... B60L 11/184
                                                       320/106
5,952,617 A    9/1999 Bergstrom
(Continued)

FOREIGN PATENT DOCUMENTS

| CN | 204011059 U | 12/2014 |
|---|---|---|
| EP | 1439622 A1 | 7/2004 |

OTHER PUBLICATIONS

ISA/CA, International Search Report and Written Opinion for corresponding PCT International Application No. PCT/CA2016/051071, dated Nov. 18, 2016.

*Primary Examiner* — Yalkew Fantu
(74) *Attorney, Agent, or Firm* — S&L US IP Attorneys, P.C.; Timothy Marc Shropshire; Eric Brandon Lovell

(57) ABSTRACT

Systems and methods relating to a compact electric substation for use with charging stations for electric vehicles. A compact substation is equipped with a suitable transformer that steps down the voltage from a mains line from a power utility company to a voltage usable for electric vehicle (EV) charging. The substation is equipped with a distribution component that distributes the lower voltage power to a number of charging stations by way of contactors controlled by a controller. The controller activates/deactivates the relevant contactor to feed power to the relevant charging station based on a user's input at a user terminal. Suitable software in the user terminal ensures that suitable signals are sent to the controller only after the user has set a time frame for how long to charge an EV. The user terminal may be a point of sale terminal that also accepts user payment for the EV recharge.

17 Claims, 6 Drawing Sheets

Related U.S. Application Data

(60) Provisional application No. 62/216,512, filed on Sep. 10, 2015.

(56) References Cited

U.S. PATENT DOCUMENTS

| | | | |
|---|---|---|---|
| 6,215,653 B1 | 4/2001 | Cochran | |
| 2009/0067205 A1* | 3/2009 | Oyobe | B60K 6/445 363/98 |
| 2010/0274697 A1* | 10/2010 | Zyren | G06Q 30/04 705/34 |
| 2013/0069592 A1* | 3/2013 | Bouman | B60L 11/1811 320/109 |
| 2014/0167697 A1* | 6/2014 | Stempin | B60L 11/1844 320/109 |
| 2017/0110895 A1* | 4/2017 | Low | H02J 7/0021 |

* cited by examiner

COMPACT POWER SUBSTATION FOR USE WITH ELECTRIC VEHICLE CHARGING STATIONS

RELATED APPLICATIONS

This application is a Continuation-in-Part of PCT International Patent Application No. PCT/CA2016/051071 filed Sep. 9, 2016 which claims the benefit of U.S. Provisional Patent Application No. 62/216,512 filed Sep. 10, 2015.

TECHNICAL FIELD

The present invention relates to power equipment for use in charging electric vehicles. More specifically, the present invention relates to power substations suitable for such charging.

BACKGROUND

The increased interest in electric vehicles in recent years will only lead to greater use and eventual ubiquity of such vehicles. Due to the environmental movement and the inevitable move away from fossil fuels, we may soon see fleets of electric vehicles replacing our current gasoline and diesel fuelled vehicles. However, the infrastructure to support such a sea change is, as yet, not in place.

While gasoline stations can currently be found everywhere, the same cannot be said for charging stations for electric vehicles. To remedy this situation, some have advocated for the installation of charging stations at apartment complexes, government buildings, and other large buildings. However, this concept has a number of issues, the most glaring being the need to retrofit each potential charging station location with suitable equipment to handle the electric load suitable for a multi-car charging station.

Current electrical equipment installed in buildings are not suitable for retrofitting for such charging stations. Such equipment is not capable of providing the voltage and current required by such charging stations, especially if multiple stations are required.

From the above, there is therefore a need for electrical equipment that is suitable for use with existing electrical infrastructure and which can be used with such charging stations for electric vehicles.

SUMMARY

The present invention provides systems, methods, and devices relating to a compact electric substation for use with charging stations for electric vehicles. A compact substation is equipped with a suitable transformer that steps down the voltage from a mains line from a power utility company to a voltage usable for electric vehicle (EV) charging. The substation is equipped with a distribution component that distributes the lower voltage power to a number of charging stations by way of contactors controlled by a controller. The controller activates/deactivates the relevant contactor to feed power to the relevant charging station based on a user's input at a user terminal. Suitable software in the user terminal ensures that suitable signals are sent to the controller only after the user has set a time frame for how long to charge an EV. The user terminal may be a point of sale terminal that also accepts user payment for the EV recharge.

In a first aspect, the present invention provides a power substation for use in charging electric vehicles, the substation comprising:

- a transformer receiving power from a utility power source, the transformer being for converting power from said power source from a higher voltage to a lower voltage, said lower voltage being useful for charging said electric vehicles;
- a distribution component receiving said power at said lower voltage and distributing said power to a plurality of electric vehicle charging stations;
- a plurality of switch components coupled between said distribution component and said plurality of charging stations, each one of said switch components being coupled between said distribution component and one of said charging stations, each of said switch components providing an electrical route for power to travel from said distribution component to one of said charging stations;
- a controller for controlling a flow of power from said distribution component to each one of said charging stations, said controller being coupled to control each one of said plurality of switch components;

wherein said controller is in communication with at least one user terminal for use by a user, said controller controlling said flow of power from said distribution component to said each one of said charging stations based on controlling input from said at least one user terminal.

In a second aspect, the present invention provides a method for controlling a power substation used for charging electric vehicles, the method comprising:

a) receiving input from a user indicating a selected one of said charging stations, said selected one of said charging stations comprising a user request;
b) receiving input from said user indicating an amount of charging time for said charging station, said amount of charging time further comprising said user request;
c) validating said user request and parameters of said user request;
d) after said user request has been validated, transmitting a connect signal to a controller in said power substation, said connect signal causing said controller to connect said selected one of said charging stations with a distributor component in said power substation;
e) timing said delivery of said power to said selected one of said charging stations;
f) transmitting a disconnect signal to said controller when said amount of charging time paid for by said user has been reached, said disconnect signal causing said controller to disconnect said selected one of said charging stations from said distributor component.

BRIEF DESCRIPTION OF THE DRAWINGS

The embodiments of the present invention will now be described by reference to the following figures, in which identical reference numerals in different figures indicate identical elements and in which.

DETAILED DESCRIPTION

Figure 1:
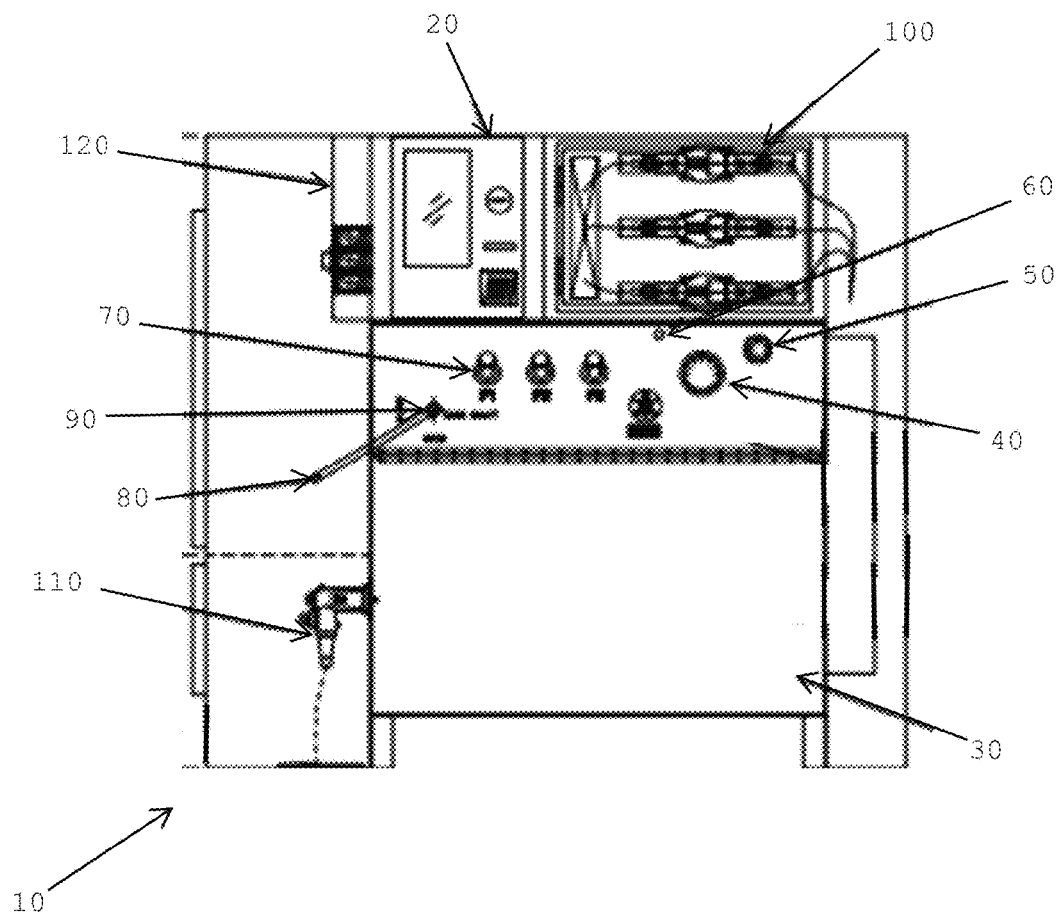
FIG. 1 is a front view of a compact power substation according to one aspect of the present invention.

Referring to FIG. 1, a front view of a compact power substation according to one aspect of the invention is illustrated. It should be clear that, in FIG. 1, the compact substation's covers, barriers, and walls have been removed where necessary to show the components reachable and usable by a user. The compact substation 10 has a user interface 20, a compartment 30 for a transformer tank containing the transformer and an insulating medium, a temperature gauge 40 for the liquid in the liquid in the transformer tank, a level gauge 50 for the liquid in the transformer tank, and a pressure relief valve 60 to relieve the pressure in the transformer tank when necessary. Fuse holders 70 hold the fuses for the system while switch handle 80 is connected to a load break oil-immersed rotary (LBOR) switch inside the substation. A viewing window 90 (see FIG. 2) is also provided so a user can visually confirm whether the LBOR switch is engaged or not. The LBOR switch positions 90 are also provided for the user's convenience and safety. As can be seen, three fuse holders are used in this implementation of the invention. Other configurations which use a different number of fuses are, of course, possible. In this implementation, each fuse is a 100 A current limiting fuse and the fuse holders (and the fuses) are only accessible when the LBOR switch is in a disconnected state (i.e. the LBOR switch is not engaged).

Also part of the compact power substation 10 is a metering compartment 100 containing a meter that measures the amount of power consumed by the substation 10 from a power utility company. As can be imagined, this meter is for the use of the utility company for power consumption measurement and billing purposes. To couple the substation 10 to utility company equipment such that the substation can receive high voltage power, a number of dead front connectors 110 are also provided. These connectors 110 connect the transformer within the substation 10 to the utility company external equipment by way of a main breaker 120.

Figure 2:
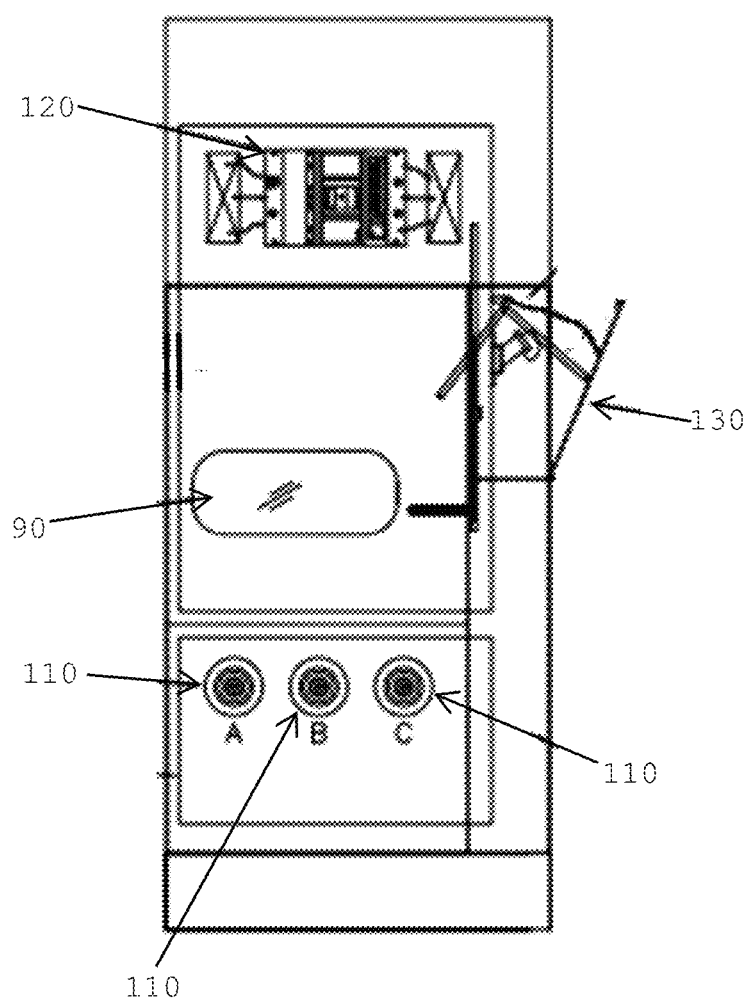
FIG. 2 is a left side view of the compact power substation illustrated in FIG. 1.

Referring to FIG. 2, a left side view of the substation 10 is provided. The viewing window for the LBOR switch is visible in FIG. 2 as well as the three dead front connectors 110 that provide power to the transformer from the utility company. Also visible is the main breaker 120 that couples the secondary side of the transformer with the metering compartment 100. Other other arrangements for such connections are also available within the substation 10. As a safety precaution, the substation 10 is equipped with a fuse door 130 that prevents access to the fuses holders 70 unless the LBOR switch is disengaged by way of the switch handle 80. The fuse door 130 is interlocked with the LBOR switch so that the fuse door cannot be opened when the LBOR switch is engaged. The fuse door can only be opened when the LBOR switch is disengaged.

Figure 3:
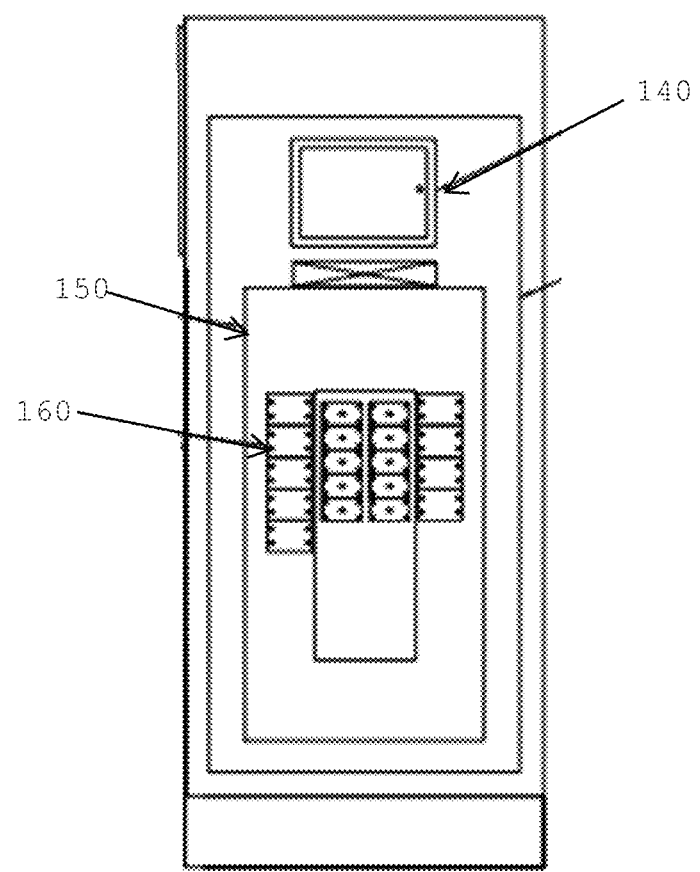
FIG. 3 is a right side view of the compact power substation illustrated in FIG. 1.

Referring to FIG. 3, a right side view of the substation 10 is provided. The right side view shows a control box 140 that contains a controller for controlling the functioning of the substation 10. Also visible is a panelboard 150 connected to a number of contactors 160. As will be explained below, these contactors or switch components, in conjunction with the controller, determine which EV charging stations are receiving power from the substation 10. It should also be clear that while the implementation illustrated in FIG. 3 uses contactors for the switch components, other devices that perform a similar function (that of allowing power to flow from the panelboard to a charging station) may be used.

Figure 4:
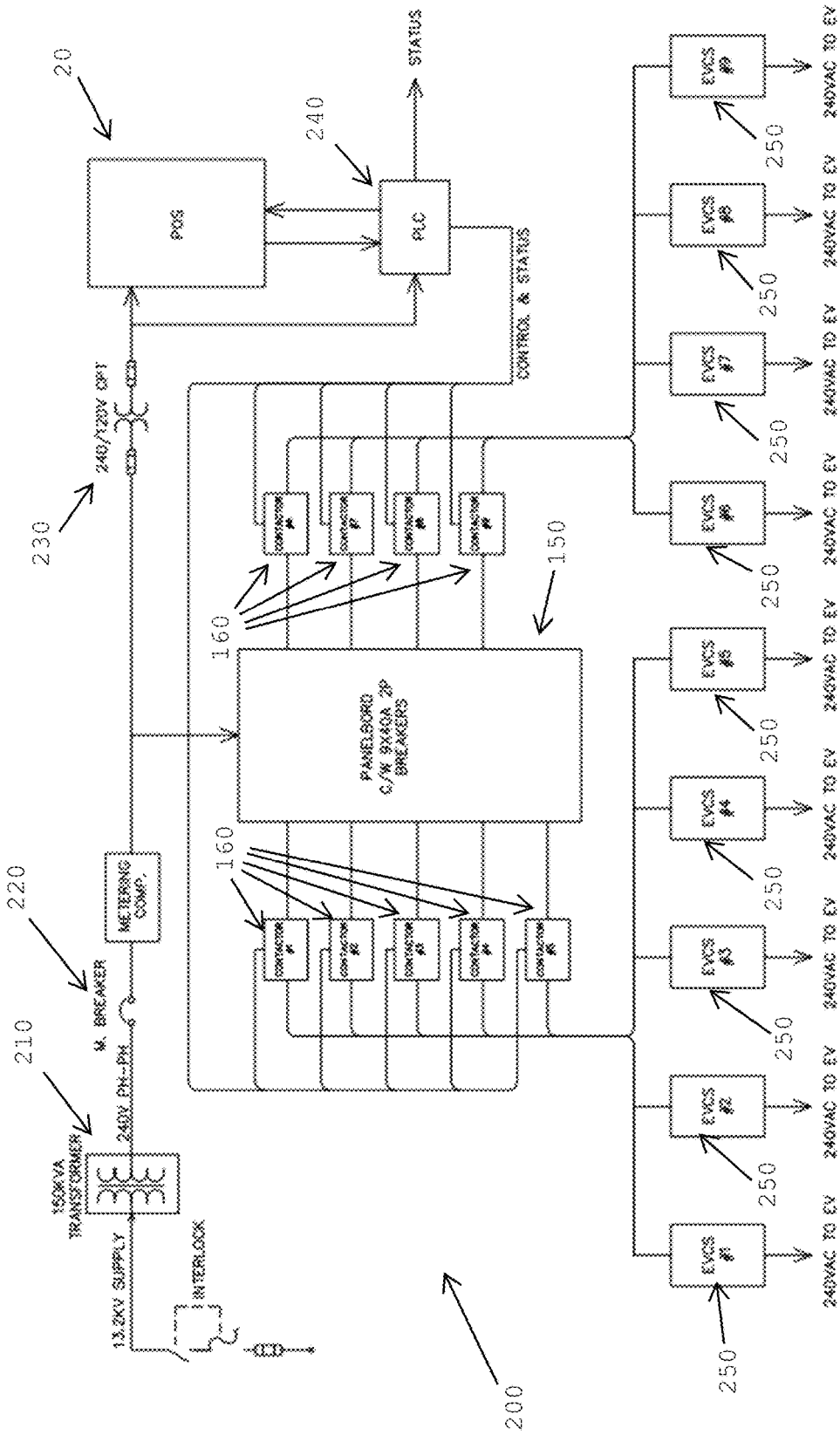
FIG. 4 is a schematic block diagram of a system according to another aspect of the present invention.

Referring to FIG. 4, a block diagram of a system according to another aspect of the present invention is provided. As can be seen, the system 200 has power coming in from the PUC to a transformer 210 in the substation 10. The transformer 210 drops the voltage to one suitable for use with EV charging stations and, after passing through a main breaker 220 and a metering component 225 (i.e. the meter in the metering compartment 100), the down-converted power is passed to the panelboard 150. At the same time, the down-converted power is passed to a control power transformer 230. From the control power transformer 230, the resulting signal is received by a point of sale terminal or user interface 20 and by the controller 240.

It should be clear that the down-converted power is distributed from the panelboard 150 to a number of contactors 160. In the system illustrated in FIG. 4, nine contactors 160 are provided, one each for nine different EV charging stations 250. Of course, other configurations with different numbers of charging stations and different numbers of contactors are possible. Each contactor 160 provides a conduit for power to pass from the panelboard 150 to a specific one of the nine EV charging stations 250. It should be clear that the panelboard is equipped with a number of circuit breakers with a circuit breaker for each contactor connected to the panelboard. Each circuit breaker, in one implementation, allows for up to 30 or 40 A of current to pass through before the circuit breaker is tripped. In other implementations, up to 70 A of current may be routed to each one of the charging stations. Other implementations of the system are provisioned for larger numbers of charging stations, e.g. 18 or 27 charging stations.

In operation, the system uses the substation 10 to down-convert the incoming utility power (a 13.2 kV supply) to a 240V ph-ph signal. This lower voltage signal emerges from the 150 kVA transformer in the substation (in one implementation) and is converted into voltages useful for control signals by the control power transformer 230. The resulting voltages are received and used by the user interface 20 and the controller 240. The 240 v ph-ph signal is distributed by the panelboard 150 to the various contactors 160. Each contactor is controlled by the controller 240. Upon receiving the relevant signal from the controller 240, a contactor 160 can establish a connection between the panelboard 150 and a specific one of the EV charging stations 250, thereby allowing power to flow to the charging station from the panelboard. Then, upon receiving another different relevant signal from the controller 240, the contactor can deactivate that link or connection between the panelboard and the specific EV charging station, thereby stopping the charging of any EV coupled to that EV charging station.

The controller 240 operates in conjunction with the user interface/point of sale terminal 20. The user interface operates to provide the user with an interface to control which EV charging station is provided with power. The user, by selecting an EV charging station connected to his or her EV, can ensure that his or her vehicle is being charged. A timer function can also be used to determine how long the user's EV is to be charged. If the user terminal 20 operates as a point of sale terminal, the terminal can also prompt the user for payment for his or her use and consumption of power from the EV charging station. As a point of sale terminal, the user interface can also receive payment from the user by well-known means such as credit card, debit card, mobile handset payments, etc.

Once the user has selected the proper EV charging station (and once payment has been made if the user interface acts as a point of sale terminal), a control signal is sent from the user interface to the controller. The controller receives this control signal and, after decoding the control signal to determine which EV charging station is to be activated, the controller sends an activation signal to the relevant contactor. This causes that relevant contactor to activate, thereby allowing power to flow to the relevant EV charging station from the panelboard. As noted above, once this has occurred, a timer may be activated by either the controller or the user interface to determine when power should be cut off from the EV charging station. When this time has been reached, the controller sends another signal to the relevant contactor. That contactor deactivates the connection between the panelboard and the EV charging station.

It should be clear that, while a 13.2 kV supply from the utility company is illustrated in the Figures, other configurations are possible. The utility company power supply can range from 4.16 kV to 34.5 kV and, for installations which use such utility company supplies, the transformer may need to be adjusted/reconfigured. As well, while the Figures detail a voltage of 240 VAC for the charging station, other voltages may also be used. It should also be clear that, to address potentially unbalanced loads, the substation may be equipped/configured with a delta secondary with a grounded phase alarm system.

It should be clear that while the system in FIG. 4 and the substation in FIGS. 1-3 only has a single user interface/point of sale terminal, other configurations with multiple user interfaces are possible. For such a configuration, each user interface/point of sale terminal may be physically remote from the substation but is in data communication with the controller in the substation. The data communication link between each of the user interfaces/point of sale terminals allow for relevant control signals to be passed between the user interface/point of sale terminal and the controller to thereby activate/deactivate the contactors.

It should also be clear that while a payment from the user may be required before power is sent to one of the EV charging stations, this is not strictly necessary as other configurations for specific users may be necessary. As an example, while the system in FIG. 4 may be implemented as a retrofit for a building such that the building can provide charging services to an EV for a fee to the user, other implementations my not require such payment. In another example, the system in FIG. 4 may be implemented without requiring payment for the charging power from the user—the system may be installed in a facility used by an EV rental company. Thus, as an example, a multi-level parking garage may be equipped with one or more substations per level with each level being operated by a different EV rental company. At a particular level, an EV may be parked at a specific charging station and be charged by the company that owns the EV and operates from that particular level. Clearly, for this example, a payment option is not necessary as each rental company would pay for its own EV charging.

It should be clear that the substation can be installed indoors or outdoors. For an outdoor installation, it is preferred that the substation be constructed according to the CSA C227.4 standard to ensure that the substation is suitable for all manners of inclement weather, including snow, rain, and wind.

Figure 5:
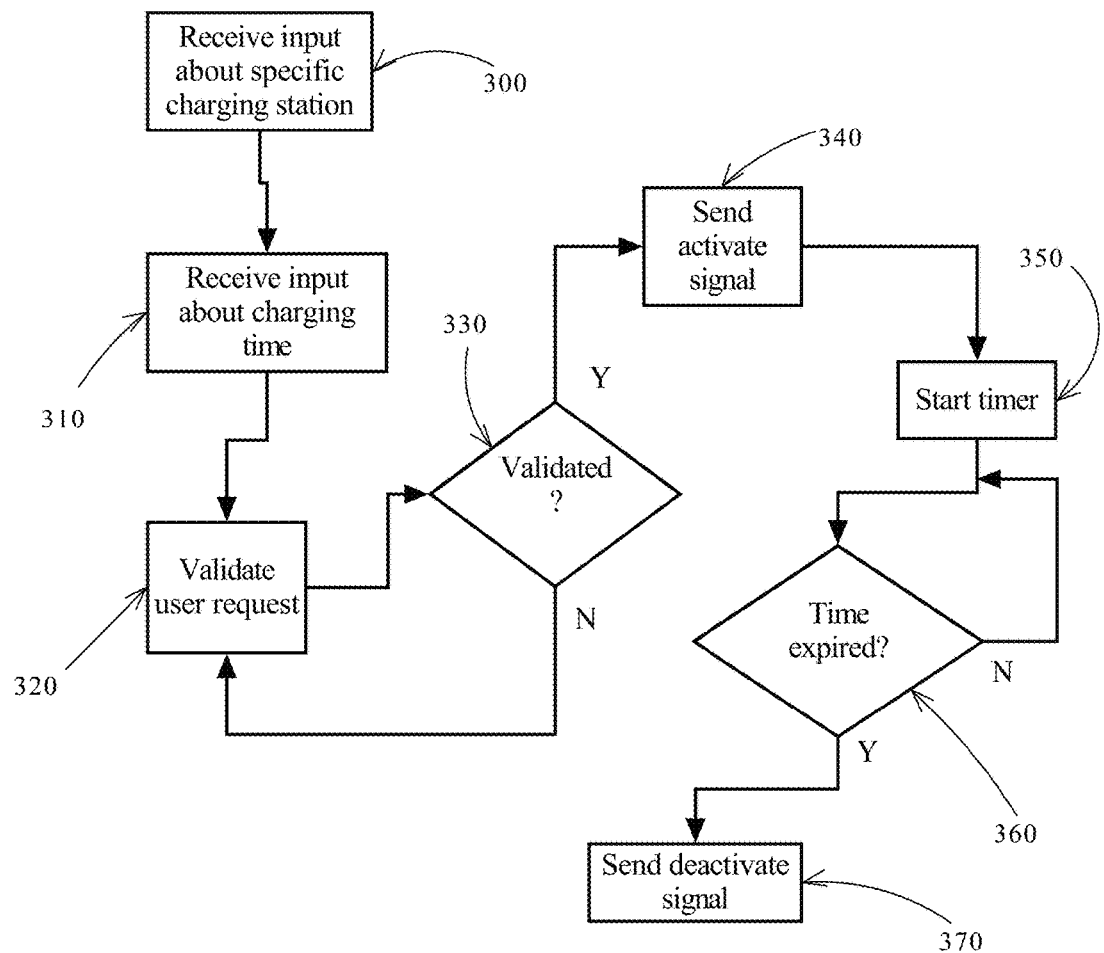
FIG. 5 is a flowchart detailing the steps in a method according to yet a further aspect of the present invention.

Referring to FIG. 5, a flowchart according to another aspect of the invention is illustrated. The method illustrated is executed by the user interface/point of sale terminal, possibly in conjunction with the controller. In the method, the initial step 300 is that of receiving input from the user. This input indicates which charging station is to be designated to receive charging power. Step 310 is that of receiving input from the user indicating how long the charging power is to be provided to the charging station designated in step 300. Once the parameters of the user request have been received, the parameters for the request being the time for charging and the charging station to be used, the user's request is then validated (step 320). Validating the request may take multiple forms such as receiving and validating a payment from the user, receiving an authorization code from the user, receiving a payment code from the user, or receiving a specific code from the user that allows the interface/terminal to dispense power to the charging station. Of course, this may involve substeps such as receiving the actual code or payment from the user, checking the code against a remote database, confirming/validating the payment, and notifying the user that the authorization for the user request has been either allowed or not allowed. The validation step may also include checking to see if a requested charging station is available. This checking if a charging station is available may take the form of checking a database or a list of available charging stations. Once a charging station has been scheduled to receive power, it can be marked as unavailable until either the EV leaves that charging station.

After the above, the validation is then checked. Step 330 is that of determining whether that user request has been validated or not. If the user request has not been validated (e.g. the code entered has expired or is not authorized or the user credit card payment has been declined), then the logic loops back to step 320. Depending on the configuration of the system, the user can then be re-prompted to provide a different authorization code or to provide an alternative means of payment.

Returning to FIG. 5, if the user request has been validated, then step 340 is that of sending a signal to the controller to cause a relevant switch and/or contactor to activate. Such an activation allows power to flow to the EV charging station. Once this activation has been performed, a timer is started (step 350). This timer is constantly checked (decision 360) to determine if the length of time entered by the user in step 310 has been reached. If not, then the logic continues to loop to step 360. Once the timer runs out, then a deactivation signal is sent to the controller (step 370). As noted above, this causes the relevant switch/contactor to be deactivated, thereby stopping the flow of charging power to the relevant EV charging station.

In one alternative, the method may also include prompting the user to agree to a load sharing option. The load sharing option would allow the system to share or shed the power load across multiple EVs. This rotates the charging between multiple EVs, thereby sharing the load. Such an option would lower the demand on the system and might be appealing to users who are parking their EV for long periods of time (e.g. overnight or throughout the day).

Figure 6:
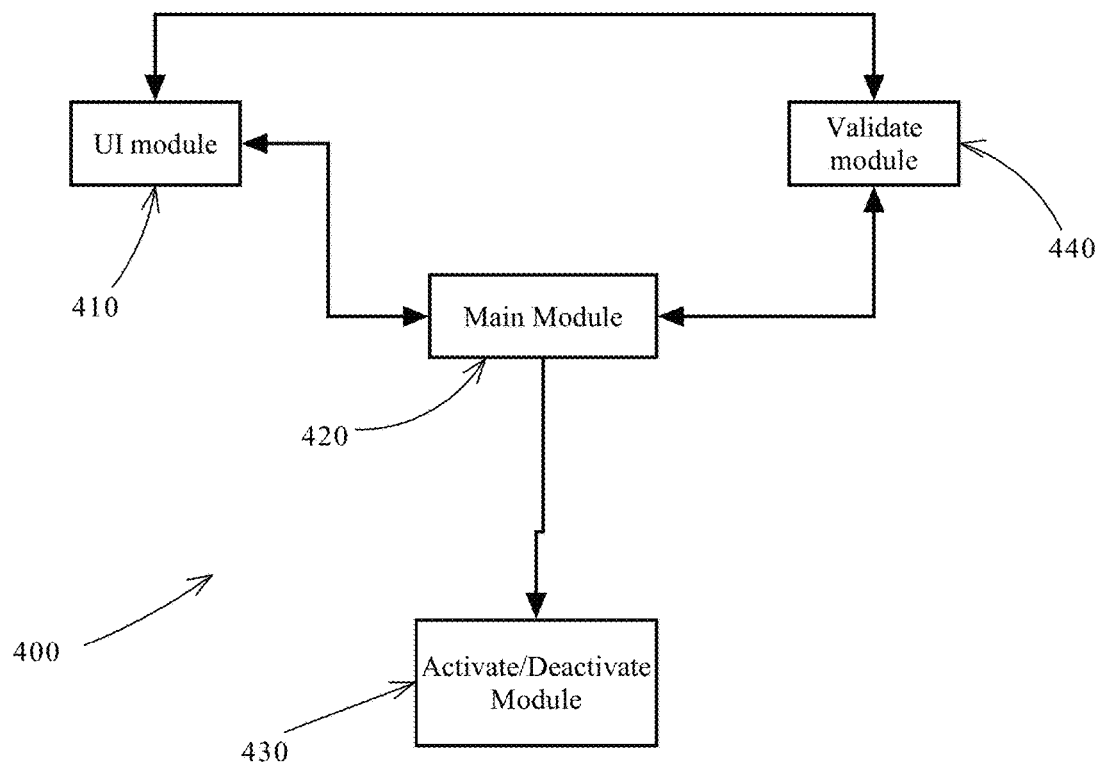
FIG. 6 is a block diagram of a system used to implement the method illustrated in FIG. 5.

To implement the method illustrated in FIG. 5, a software system as shown in FIG. 6 may be used. The various modules may be purely software modules or they may be hardware modules executing software. The system 400 includes a user interface module 410 and a main module 420. An activate/deactivate module 430 may also be present along with a validation module 440. The user interface module 410 provides the system with the I/O functions necessary for the user to interact with the system. The main module 420 runs the main logic of the system as well as any timer functions. The activate/deactivate module 430 receives the parameters for activating/deactivating the relevant contactor/switch. As an example, the main module 420 can send a signal to the activate/deactivate module 430 with the parameters necessary to activate the contactor for a specific EV charging station to be activated. Similarly, the main module 420 can send another signal to the activate/deactivate module 430 with different parameters that causes the module 430 to deactivate a different specific contactor and thereby cut off power to a different charging station. The validate module 440 can, depending on the configuration, take different forms with different functions. As an example, the validation module 440 can be a payment module that accepts different forms of user payment ranging from credit cards, debit cards, mobile phone payments, and/or coupons. For such a configuration, the validate module would be equipped to communicate with a payment clearing house or some other similar organization that determines whether a user's payment is accepted or declined. Once accepted, the user's request is validated and a suitable signal detailing such a validation is sent back to the main module. Alternatively, the validate module can be configured to receive authorization codes. A user can thus merely enter codes which, when validated by accessing a database of valid codes, causes a valid code signal to be returned to the main module. This validation of the user request can thus cause the main module to send an activate signal to the activate/deactivate module.

The embodiments of the invention may be executed by a computer processor or similar device programmed in the manner of method steps, or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g."C") or an object-oriented language (e.g."C++", "java", "PHP", "PYTHON" or "C#"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

I claim:

1. A power substation for use in charging electric vehicles, the substation comprising:
   a transformer receiving power from a utility power source, the transformer being for converting power from said power source from a higher voltage to a lower voltage, said lower voltage being useful for charging said electric vehicles;
   a distribution component receiving said power at said lower voltage and distributing said power to a plurality of electric vehicle charging stations;
   a plurality of switch components coupled between said distribution component and said plurality of charging stations, each one of said switch components being coupled between said distribution component and one of said charging stations, each of said switch components providing an electrical route for power to travel from said distribution component to one of said charging stations;
   a controller for controlling a flow of power from said distribution component to each one of said charging stations, said controller being coupled to control each one of said plurality of switch components;
   wherein
   said controller is in communication with at least one user terminal for use by a user, said controller controlling said flow of power from said distribution component to said each one of said charging stations based on controlling input from said at least one user terminal.

2. The power substation according to claim 1, wherein said at least one point of sale terminal is part of said power substation.

3. The power substation according to claim 1, further comprising a metering component for measuring an amount of power consumed by said substation.

4. The power substation according to claim 1, wherein said at least one user terminal is at least one point of sale terminal.

5. The power substation according to claim 4, wherein said at least one point of sale terminal includes a payment subsystem for receiving payments from users for an amount of power to be dispensed to an electric vehicle at one of said charging stations.

6. The power substation according to claim 1, wherein said at least one user terminal comprises a processor and a computer readable data storage medium for storing computer readable and computer executable instructions, wherein when said computer executable instructions are executed by said processor, said instructions implement a method comprising:

a) receiving input from a user indicating a selected one of said charging stations;

b) receiving input from said user indicating an amount of charging time for said charging station;

c) transmitting a connect signal to said controller, said connect signal causing said controller to couple said selected one of said charging stations with said distributor component by way of one of said switch components to thereby deliver power to said selected one of said charging stations;

d) timing said delivery of said power to said selected one of said charging stations;

e) transmitting a disconnect signal to said controller when said amount of charging time paid for by said user has been reached, said disconnect signal causing said controller to de-couple said selected one of said charging stations from said distributor component by way of said one of said switch components.

7. The power substation according to claim 6, further including a validation step of validating said user request prior to step c).

8. The power substation according to claim 7, wherein said validation step comprises receiving payment from said user for said amount of charging time.

9. The power substation according to claim 7, wherein said validation step comprises receiving an authorization code from said user and confirming that said authorization code is valid.

10. The power substation according to claim 1, wherein said transformer is an oil-filled transformer.

11. The power substation according to claim 1, wherein said distribution component comprises a panelboard having a plurality of circuit breakers.

12. The power substation according to claim 1, wherein said switch components comprises contactors.

13. A method for controlling a power substation used for charging electric vehicles, the method comprising:

a) receiving input from a user indicating a selected one of said charging stations, said selected one of said charging stations comprising a user request;

b) receiving input from said user indicating an amount of charging time for said charging station, said amount of charging time further comprising said user request;

c) validating said user request and parameters of said user request;

d) after said user request has been validated, transmitting a connect signal to a controller in said power substation, said connect signal causing said controller to connect said selected one of said charging stations with a distributor component in said power substation;

e) timing said delivery of said power to said selected one of said charging stations;

f) transmitting a disconnect signal to said controller when said amount of charging time paid for by said user has been reached, said disconnect signal causing said controller to disconnect said selected one of said charging stations from said distributor component.

14. The method according to claim 13, wherein step c) comprises receiving payment from said user for said amount of charging time.

15. The method according to claim 13, wherein step c) comprises receiving an authorization code from said user and confirming that said authorization code is valid.

16. The method according to claim 13, wherein step c) comprises determining said selected one of said charging stations is available.

17. The method according to claim 13, wherein said method is implemented using multiple user interfaces, at least one of said multiple user interfaces being physically remote from said power substation housing.

\* \* \* \* \*